United States Patent [19]

Sayigh

[11] 3,876,570

[45] Apr. 8, 1975

[54] POLYURETHANE FOAMS BASED ON CERTAIN ALKOXYLATED CYANOETHYLATED ARYL AMINES

[75] Inventor: Adnan A. R. Sayigh, North Haven, Conn.

[73] Assignee: The Upjohn Company, Kalamazoo, Mich.

[22] Filed: July 11, 1973

[21] Appl. No.: 378,314

Related U.S. Application Data

[62] Division of Ser. No. 118,576, Feb. 24, 1971, Pat. No. 3,766,240.

[52] U.S. Cl. .............................. 260/2.5 AQ; 252/182
[51] Int. Cl. ...................... C08g 22/14; C08g 22/44
[58] Field of Search ............... 260/2.5 AQ, 2.5 AF; 252/182

[56] References Cited
UNITED STATES PATENTS

| | | | |
|---|---|---|---|
| 3,423,344 | 1/1969 | Odinak | 260/2.5 AQ |
| 3,499,009 | 3/1970 | Odinak | 260/2.5 AQ |
| 3,674,718 | 7/1972 | Early | 260/2.5 AQ |
| 3,766,240 | 10/1973 | Sayigh | 260/2.5 AQ |

*Primary Examiner*—Donald E. Czaja
*Assistant Examiner*—C. Warren Ivy
*Attorney, Agent, or Firm*—Denis A. Firth; John Kekich

[57] ABSTRACT

Polyols are described having the formula:

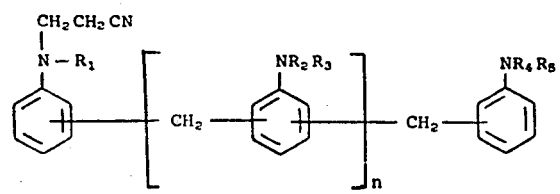

wherein $R_1$, $R_3$, $R_5 = -(A - O)_x-$ H where A is the alkylene residue of a vicinal alkylene oxide of from 2 to 4 carbon atoms and $x$ is an integer from 1 to 20; and wherein $R_2$ and $R_4$ are $-CH_2CH_2CN$ or $-(A - O)_x-$ H and n is an integer from 0 to 4. The above polyols are obtained by alkoxylation of the corresponding mono- or poly-N-cyanoethyl derivatives of the appropriate methylene bridged polyphenyl polyamines. The above polyols and blends thereof with supplementary polyols of functionality 2 to 6 and hydroxyl equivalent weights of 30 to 200, are useful in preparing polyurethane foams.

3 Claims, No Drawings

POLYURETHANE FOAMS BASED ON CERTAIN ALKOXYLATED CYANOETHYLATED ARYL AMINES

This application is a division of application Ser. No. 118,576 filed Feb. 24, 1971 now U.S. Pat. No. 3,766,240.

BACKGROUND OF THE INVENTION

1. Field of the Invention

This invention relates to alkoxylated polyamines and is more particularly concerned with alkoxylated N-cyanoethyl derivatives of methylene-bridged polyphenyl polyamines and with methods for their preparation and with polyurethane foams derived therefrom.

2. Description of the Prior Art

Polyols obtained by alkoxylation of methylene dianiline and of polyamine mixtures obtained by the acid condensation of aniline and formaldehyde are well known in the art; see, for example, U.S. Pat. Nos. 3,423,344 and 3,499,009. Such polyols, when used as the polyol component in the preparation of polyurethane foams, give rise to foams having excellent structural strength and stability. The alkoxylated polyamine polyols of this type are generally blended with a minor amount of a polyol of low molecular weight in order to reduce the relatively high viscosity of the polyamine-based polyols.

We have now found that the compatibility of the alkoxylated polyamine polyols of the above type with the various other components, particularly the fluorocarbon blowing agents, employed in the polyurethane foam forming reaction mixture, can be enhanced by chemical modification of the polyamines prior to alkoxylation. Not only does such modification of the polyamines not detract significantly from the excellent properties of polyurethane foams derived therefrom, but as will be discussed in detail hereafter, the properties of said foams are enhanced in a highly useful manner.

Accordingly, it is an object of this invention to prepare alkoxylated polyamines having improved properties. It is a further object of this invention to prepare polyurethane foams having improved properties by employing the novel alkoxylated polyamines as a part, or the whole, of the polyol component used to prepare said foams.

SUMMARY OF THE INVENTION

The invention comprises novel polyols selected from the class consisting of:

a. polyols having the formula:

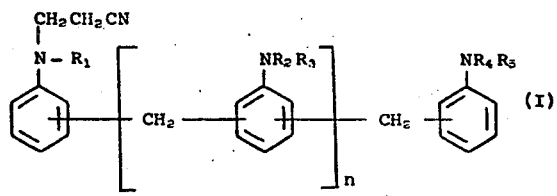

(I)

wherein $R_1$, $R_3$, and $R_5$ each represent $-(A-O)_{\overline{x}} H$ wherein A is the alkylene residue of a vicinal alkylene oxide of from 2 to 4 carbon atoms, inclusive, and $x$ is an integer from 1 to 20 and $R_2$ and $R_4$ are each selected from the class consisting of $-CH_2CH_2CN$ and $-(A-O)_{\overline{x}}- H$ wherein A and $x$ are as above defined, and wherein $n$ is an integer from 0 to 4, inclusive; and b. mixtures of said polyols of the above formula.

The invention also comprises polyol blends which contain from about 90 to about 10 percent by weight of a polyol of formula (I), or a mixture of such polyols, and from about 10 to about 90 percent by weight of a supplementary polyol having a functionality in the range of 2 to 6, inclusive, and an equivalent weight in the range of 30 to 200.

The invention also comprises polyurethane foams which are derived from the polyols of formula (I), mixtures thereof, and blends thereof with supplementary polyols of the character defined above.

DETAILED DESCRIPTION OF THE INVENTION

The novel polyols of the invention having the formula (I) are prepared by alkoxylation of the corresponding polyamines of the formula:

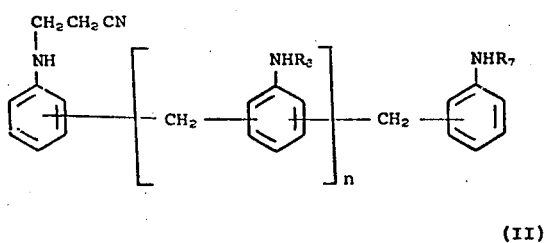

(II)

wherein $n$ has the significance hereinbefore defined and $R_6$ and $R_7$ are selected from the group consisting of hydrogen and $-CH_2CH_2CN$.

The alkoxylation of the polyamines of formula (II) is carried out by reacting the latter with the appropriate vicinal alkylene oxide of from 2 to 4 carbon atoms, inclusive, under conditions described in, for example, U.S. Pat. No. 3,423,344. Thus, the reaction is carried out advantageously by bringing the alkylene oxide and the polyamine together at a temperature in the range of about 125°C to about 250°C at atmospheric pressure or, preferably, at superatmospheric pressure such as from about 1 atmospheres to about 8 atmospheres or higher.

Depending on the amount of alkylene oxide which is to be reacted with the polyamine (II), i.e. depending on the desired value of $x$ in the polyols of the formula (I), it will, or will not, be necessary to employ a catalyst in the alkoxylation. Thus, an amount of alkylene oxide corresponding to 1 mole for each free hydrogen atom attached to the amino N atoms in the polyamine (II) will generally react readily with the polyamine (II) without the use of the catalyst. Where higher amounts of alkylene oxide are to be reacted with the polyamine (II), i.e. where the value of $x$ in one or more of the $-(A-O)_{\overline{x}} H$ groups of the polyol (I) is required to be higher than 1, it is necessary to employ an appropriate alkoxylation catalyst in reacting the alkylene oxide and the polyamine (II). Any of the alkoxylation catalysts known in the art can be employed for this purpose. Illustrative of these catalysts are alkali metals, such as sodium and potassium, and alkali metal hydroxides, such as sodium hydroxide, potassium hydroxide and the like.

The proportion of alkylene oxide employed in the preparation of the polyols of the invention can vary within wide limits depending upon the number of free hydrogen atoms attached to the amino N atoms in the polyamines of formula (II). Thus, the proportion of alkylene oxide employed will be within the range of about 1 mole for each such free hydrogen atom up to a maxiumu of about 20 moles for each such free hydrogen atom. A preferred proportion of alkylene oxide is from about 1 to about 10 moles of alkylene oxide per free hydrogen atom on the amino N atoms of polyamine (II). A most preferred proportion of alkylene oxide is approximately 1 mole per free hydrogen atom on the amino N atoms of polyamine (II).

The vicinal alkylene oxides which are employed in preparing the polyols of formula (I) in accordance with the above procedures are inclusive of ethylene oxide, 1,2-propylene oxide, 1,2-butylene oxide, and mixtures thereof. By employing a mixture of two or more alkylene oxides in place of a single alkylene oxide in the above alkoxylation reaction, it is possible to obtain polyols (I) which have substantially random distribution of correspondingly different alkylene residues (A) in the molecule, the proportion of the various alkylene residues (A) being roughly equivalent to the relative molar proportions in which the different alkylene oxides are employed in the reaction mixture.

Similarly, by carrying out the alkoxylation in two stages, using one alkylene oxide in the first step and a second, and different, alkylene oxide in the second step, it is possible to obtain polyols in which different alkylene residues (A) are present in any desired sequence in each of the various oxyalkylene chains present in the polyol (I). Such sequential addition of alkylene oxides in the preparation of hydroxyalkylated polyamines is well recognized in the art; see, for example, U.S. Pat. No. 3,499,009. It is to be understood that the products obtained by alkoxylation using a mixture of two or more alkylene oxides, and those obtained by sequential alkoxylation using stepwise addition of two or more alkylene oxides, are within the scope of the polyols (I) of the invention in addition to those polyols (I) which are obtained by alkoxylation using a single alkylene oxide.

Although a reaction diluent is usually not necessary in carrying out the above alkoxylations, an inert diluent can be present in the reaction mixture, if desired, to aid in the dispersion of the alkylene oxide into the polyamine mixture. Illustrative of such inert diluents are monochlorobenzene, N,N-dimethylformamide, N,N-dimethylacetamide, xylene, toluene, benzene, dichlorobenzene and the like.

The polyols of formula (I) obtained by the above procedures generally do not require any purification other than removal of any unreacted alkylene oxide and/or inert diluent if one has been used in the reaction. Such removal can be accomplished generally by subjecting the reaction product to reduced pressure at a temperature sufficient to volatilize any alkylene oxide or inert diluent which is present. In the case where an alkaline catalyst, such as an alkali metal hydroxide, has been employed in the alkoxylation, it is generally desirable to neutralize said catalyst by the addition of the appropriate amount of an acid such as phosphoric acid, acetic acid and the like, or preferably by treatment with an ion exchange resin or an activated silicate of which highly absorptive synthetic anhydrous magnesium, calcium, or aluminum silicates are examples, in accordance with procedures well-known in the art; see, for example, U.S. Pat. No. 3,042,725.

The polyols (I) prepared as described above are amber to brownish clear resinous materials having viscosities ranging from about 100 centipoises to about 500,000 centipoises at 50°C. In general the greater the number of moles of alkylene oxide per amino group reacted with the polyamine (II), the lower the viscosity of the resulting polyol (I).

The polyamines (II) employed in the above-described alkoxylation are obtained by cyanoethylation of the corresponding primary polyamines of the formula:

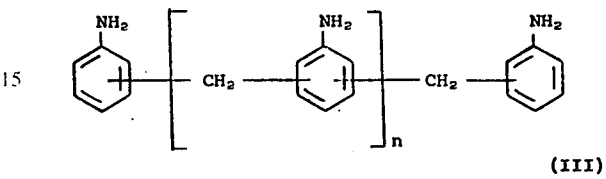

(III)

wherein $n$ has the significance hereinbefore defined. The cyanoethylation of the primary polyamines (III) is carried out advantageously by reaction of the latter with the appropriate molar proportion of acrylonitrile in the presence of a copper catalyst, such as cupric acetate monohydrate, in accordance with the conditions described, for example, by Heininger, J. Am. Chem. Soc. 22, 1213, 1957. The N-cyanoethylated polyamines (II) in which only one amino nitrogen is substituted by cyanoethyl (i.e. II; $R_6$ and $R_7 = H$) are obtained by using equimolar amounts of acrylonitrile and primary polyamine (III) in the cyanoethylation. For each additional cyanoethyl group which is to be introduced into the primary polyamine (III), it is merely necessary to introduce an additional molar proportion of acrylonitrile into the cyanoethylation reaction mixture.

The primary polyamines of the formula (III) which are employed as starting materials in the above-described cyanoethylation are a well-recognized class of methylene bridged polyphenyl polyamines. The primary polyamines of the formula (III) are inclusive of methylene dianiline itself in its various isomeric forms, namely 4,4'-methylene dianiline, 2,4'-methylene dianiline, and 2,2'-methylene dianiline as well as mixtures thereof, and are also inclusive of mixtures of polyamines containing methylene dianiline as a component thereof in amount from about 35 percent by weight to about 90 percent by weight of said mixtures. The latter mixtures of methylene bridged polyphenyl polyamines are generally prepared by condensing aniline and formaldehyde in the presence of a mineral acid, preferably hydrochloric acid, in accordance with procedures well-known in the art; see, for example, U.S. Pats. Nos. 2,683,730; 2,950,263; 3,012,008; 3,277,173; and 3,362,979. Such procedures generally give rise to a mixture of methylene dianiline and the corresponding trimers, tetramers, and higher polymeric products. The formula (II) shown above for the primary polyamines is intended to encompass methylene dianiline itself as well as the mixtures of methylene bridged polyphenyl polyamines obtained by acid condensation of aniline and formaldehyde as described above.

The polyols (I) of the invention can be employed in the preparation of polyurethane foams, in accordance with procedures well-known in the art, by replacing part or the whole of the polyol component conventionally employed in the preparation of such foams, by an equivalent amount of the appropriate polyol (I) of the invention. Flexible, semi-flexible, semi-rigid, and rigid polyurethane foams can be prepared in this manner. When the viscosities of the polyols (I) of the invention are at a high level, it is advantageous to blend the same with a supplementary polyol which has lower viscosity and, accordingly, yields a blend of sufficiently low viscosity to be pumped and dispensed conveniently using conventional polyurethane foam mixing and dispensing machinery.

Such supplementary polyols can be any of the known polyols having a functionality in the range of about 2 to about 6, inclusive, and a hydroxyl equivalent weight in the range of about 30 to about 200. Illustrative of polyols which can be employed alone, or in combination, as supplementary polyols are:

i. aliphatic diols having a molecular weight from about 60 to about 400 such as ethylene glycol, 1,2-propylene glycol, 1,3-propanediol, 1,4-butanediol, 2,3-butanediol, 1,5-pentanediol, 1,2-hexanediol, diethanolamine, diisopropanolamine, 1,1-dimethylolethylamine and the like, and the adducts thereof with one or more molar proportions of ethylene oxide, propylene oxide, or 1,2-butylene oxide;

ii. aliphatic triols having a molecular weight from about 106 to about 600 such as trimethylolmethane, trimethylolethane, trimethylolpropane, 1,2,3-hexanetriol, 1,2,6-hexanetriol, 1,1,1-trimethylolhexane, triethanolamine, tripropanolamine, triisopropanolamine and the like, and adducts of the above named compounds, and of glycerol, with one or more molar proportions of ethylene oxide, propylene oxide, or 1,2-butylene oxide;

iii. aliphatic tetrols having a molecular weight from about 120 to about 800 such as erythritol, pentaerythritol, and the adducts thereof with one or more molar proportions of ethylene oxide, propylene oxide, or 1,2-butylene oxide;

iv. aliphatic pentols having a molecular weight from about 150 to about 1000 such as arabitol, xylitol and the like and adducts thereof with one or more molar porportions of ethylene oxide, propylene oxide, or 1,2-butylene oxide;

v. aliphatic hexols having a molecular weight from about 180 to about 1200 such as mannitol, sorbitol, dipentaerythritol and the like and adducts thereof with one or more molar proportions of ethylene oxide, propylene oxide or 1,2-butylene oxide; and vi. aniline-alkylene oxide diol adducts having a molecular weight from about 60 to about 400 such as the adducts of aniline with ethylene oxide, propylene oxide, 1,2-butylene oxide and the like.

Preferred supplementary polyols for use in making polyol blends with the polyols (I) of the invention are aliphatic triols meeting the above defined requirement of hydroxyl equivalent weight. Particularly preferred polyols are adducts of glycerol and propylene oxide having an equivalent weight within the range of 30 to 90 and adducts of trimethylolpropane and ethylene oxide having an equivalent weight within the range of 45 to 90.

The novel polyols and polyol blends of the invention are, as previously stated, intermediates in the preparation of polyurethanes using procedures conventional in the art. While the polyols of the invention can be applied to the formation of any type of polyurethane, including cellular and non-cellular polyurethanes, they are of particular application in the preparation of cellular polyurethane products. Accordingly, the use of the polyols of the invention will be illustrated by reference to the preparation of cellular products, but it is to be understood that the invention is not limited thereto but is of general application to the preparation of polyurethanes of all types.

The various methods for the preparation of polyurethane foams are well known in the art and do not require further detailed discussion; see, for example, Dombrow, "Polyurethanes" Reinhold Publishing Corp., New York, pages 1 to 105 (1975); Saunders et al. "Polyurethanes", Part II, Interscience Publishers, New York, 1964. Further the mode of use of alkoxylated polyamines, of a type closely related to the alkoxylated N-cyanoethylated polyamines of the invention, in the preparation of polyurethane foams has been described in detail in U.S. Pats. Nos. 3,423,344 and 3,499,009, the disclosures of which are incorporated herein by reference. Suffice it to say that the polyols (I) of the present invention can be used in all the ways set forth in the above U.S. patents, including use in combination with the known polyols of the art which are illustrated at length therein.

It has been found that the use of the polyols (I), and blends thereof, in the preparation of polyurethanes gives rise to products which possess unexpectedly enhanced properties. Further, it has been found that the polyols (I) of the invention, and blends thereof, possess markedly enhanced compatibility, as compared with the closely related polyols of the above U.S. patents, with the various other components of the polyurethane foam forming mixture. This enhanced compatibility is particularly evident in respect of the compatibility of the polyols (I) with the fluorocarbon blowing agents conventionally employed in the polyurethane art. Not only is such compatibility desirable in terms of the ease of mixing the various foam reaction components to form a polyurethane but in terms of the storage stability of mixtures of two or more foam components which may be blended together and stored for long periods before being admixed with the remainder of the reactants necessary to produce a polyurethane foam. The latter practice is very common particularly in the segment of the polyurethane industry which deals in the supply of systems, i.e. the furnishing of two or more containers of preblended components which when mixed together produce the polyurethane foam designed for a particular purpose.

Further, it has been found that the polyols (I) of the invention give rise to flexible polyurethane foams which possess significantly enhanced load bearing properties and fire retardance as commpared with foams prepared under identical conditions from the closely related polyols of the aforesaid U.S. Pats. Nos. 3,423,344 and 3,499,009. In addition, rigid polyurethane foams prepared from the polyols (I) of the invention possess significantly enhanced compressive strength properties and fire retardance as compared with rigid foams prepared under identical conditions using the polyols set forth in the aforesaid U.S. patents.

The polyurethanes prepared in accordance with the invention are useful for all purposes for which such polyurethanes are generally employed; see, for example, U.S. Pat. No. 3,499,009.

The following examples describe the manner and process of making and using the invention and set forth the best mode contemplated by the inventor of carrying out the invention but are not to be construed as limiting.

EXAMPLE 1

A. A mixture of (i) 2060 g (20 equivalents) of a mixture of methylene-bridged polyphenyl polyamines containing approximately 50 percent by weight of methylene dianiline and prepared by the acid condensation of approximately 4 moles of aniline and 2.26 moles of formaldehyde; (ii) 1060 g (20 moles) acrylonitrile; (iii) 82 g of cupric acetate; and (iv) 10 g of hydroquinone; was heated with stirring until the temperature of the reaction mixture reached 77°C. At this point the external heating source was turned off and the exothermic nature of the reaction raised the temperature of the reaction mixture to 123°C. When the exotherm ceased the reaction mixture was heated externally to maintain a temperature of approximately 123°C in the mixture for 3 hours. At the end of this period the more volatile components of the resulting mixture were removed by distillation under vacuum at 150°C for 1 hour. There was thus obtained a polyamine mixture corresponding in distribution of diamine and polyamines to the starting polyamine, i.e. containing approximately 50 percent by weight diamine, the remainder of said mixture being polyamines of higher functionality, but having each amino N atom substituted by $-CH_2CH_2CN$.

B. A total of 1055.9 g (6.7 equivalents) of the cyanoethylated polyamine prepared as described above was placed in an autoclave and heated to 169°C with agitation. Ethylene oxide was pumped into the autoclave and an exotherm occurred. When the temperature of the reaction mixture reached 184°C the external heat was turned off and the exotherm raised the temperature of the reaction mixture to 219°C. After a total of 294.8 g (6.7 moles) of ethylene oxide had been added, the autoclave was cooled and vented and the reaction product was removed therefrom. Volatile components were removed by heating the reaction product at 155°C and 1 mm of mercury pressure. There was thus obtained a poly-N-cyanoethylated polyamine — ethylene oxide adduct having approximately 1 mole of ethylene oxide per amine group in the polyamine, a hydroxyl equivalent weight of 203 and a viscosity of about 450,000 centipoises at 50°C.

EXAMPLE 2

A total of 455.4 g (2.9 equivalents) of the cyanoethylated polyamine prepared as described in EXAMPLE 1A was placed in an autoclave and heated to 124°C before pumping propylene oxide slowly into the autoclave. The temperature of the reaction mixture rose to 150°C and was maintained at approximately this level while a total of 170 g (2.93 moles) of propylene oxide was introduced over a period of 2 hours. The resulting product was cooled, the autoclave was vented and the reaction mixture was removed therefrom and heated at 150°C and 1 mm of mercury for 1 hour to remove volatile material. The deep brown residue was a poly-N-cyanoethylated - polyamine propylene oxide adduct having approximately 1 mole of propylene oxide per amine group in the polyamine, a hydroxyl equivalent weight of 215, and a viscosity of 375,000 centipoises at 50°C.

EXAMPLE 3

A. A mixture of 2060 g (20 equivalents) of the mixture of methylene-bridged polyphenyl polyamines employed as starting material in EXAMPLE 1A, 530 g (10 moles) of acrylonitrile, 41 g of cupric acetate and 5 g of hydroquinone was heated with agitation until the temperature of the reaction mixture reached 95°C. At the latter temperature the external heating source was turned off and the exothermic nature of the reaction raised the temperature to 127°C. When the exotherm ceased, the reaction mixture was heated externally to maintain a temperature of approximately 120° to 125°C and heating was continued for 3 hours with agitation. At the end of this period the more volatile components of the resulting mixture were removed by distillation under vacuum at 150°C for 1 hour. There was thus obtained a polyamine mixture corresponding in distribution of diamine and polyamine to the starting polyamine, i.e. containing approximately 50 percent by weight of diamine, the remainder of said mixture being polyamines of higher functionality, and having approximately 1 in every 2 amino N-atoms substituted by $-CH_2CH_2CN$. Equivalent weight = 86 based on active hydrogen.

B. A total of 433.7 g (5.16 equivalents) of the N-cyanoethylated polyamine prepared as described in Part A above was charged to an autoclave and heated. When the temperature reached 93°C ethylene oxide was pumped into the autoclave and an exotherm occurred. When the temperature of the reaction mixture reached 140°C, the external source of heat was turned off. The exotherm continued until the temperature reached 210°C. A total of 340 g (7.75 mole) of ethylene oxide was introduced into the autoclave. The autoclave was finally cooled and vented and the reaction product removed therefrom. Volatile components were removed by heating the reaction product at 150°C and 1 mm of mercury pressure for 1 hour. There was thus obtained a poly-N-cyanoethylated polyamine - ethylene oxide adduct having approximately 1 in 2 nitrogen atoms substituted by -cyanoethyl and approximately 1.5 moles of ethylene oxide per amine group in the polyamine, a hydroxyl equivalent weight of 146.0 and a viscosity of about 125,000 centipoises at 50°C.

EXAMPLE 4

A total of 425.3 g (4.95 equivalents) of the N-cyanoethylated polyamine prepared as described in EXAMPLE 3, part A, was charged to an autoclave and heated. When the temperature reached 150°C, propylene oxide was added slowly and the temperature of the reaction mixture was maintained at about 150°C until a total of 290 g (5 moles) of propylene oxide had been added. The autoclave was then cooled and vented and the reaction mixture was removed therefrom. The reaction was heated at 150°C and 2 mm of mercury pressure to remove volatile material. There was thus obtained a poly-N-cyanoethylated polyamine - propylene oxide adduct having approximately 1 in 2 nitrogen atoms substituted by - cyanoethyl and approximately 1.5 moles of propylene oxide per amine group in the polyamine, a hydroxyl equivalent weight of 143 and a viscosity of about 85,000 centipoises at 50°C.

EXAMPLE 5

A. A mixture of 1980 g (9.90 moles) of 4,4'- methylene di(aniline) (m.p. = 90°C), 1060 g (20 moles) of acrylonitrile, 32 g of cupric acetate and 10 g of hydroquinone was heated to 95°C with stirring. At that temperature the external source of heat was turned off and an exotherm occurred which was controlled partially, to keep the reaction mixture temperature below 145°C, by external cooling. After the exotherm had subsided, the reaction mixture was heated, with stirring, for 2 hours at 125°C. Volatile material remaining in the reaction mixture was removed by heating at 150°C and 1 mm pressure of mercury for 1 hour. The residual black material was extracted with benzene. The benzene extract was evaporated to dryness and the residue was recrystallized from ethanol. There was thus obtained N,N'-di(2-cyanoethyl)-4,4'-methylene di(aniline) in the form of a crystalline solid having a melting point of 113°–120°C.

B. A mixture of 200 g (0.65 mole) of N,N'-di(2-cyanoethyl)-4,4'-methylene di(aniline), 400 g of xylene and 1 ml of glacial acetic acid was charged to an autoclave and the mixture was heated to 130°C. Ethylene oxide was then pumped into the autoclave until a total of 77 g. (1.75 moles) had been added; the exotherm raised the temperature of the reaction mixture to 168°C. The autoclave was cooled and vented and the reaction product was removed therefrom. The solvent was distilled from the reaction product under reduced pressure and the residue was crystallized from aqueous methanol. There was thus obtained 102 g of N,N'-di(2-cyanoethyl)-N,N'-di(2-hydroxyethyl)-4,4'-methylene di(aniline) in the form of a crystalline solid having a melting point of 92° to 112°C.

EXAMPLE 6

Using the procedure of EXAMPLE 5, but replacing the ethylene oxide employed in Part B thereof by an equivalent amount of propylene oxide, there was obtained N,N'-di(2-cyanoethyl)-N,N'-di(2-hydroxypropyl)-4,4'-methylene di-(aniline) in the form of a glassy solid.

EXAMPLE 7

Using the procedure of EXAMPLE 1, part B, but incorporating 5 g of potassium hydroxide into the initial reaction mixture and increasing the amount of ethylene oxide to 589.6 g (13.4 moles) there was obtained a poly-N-cyanoethylated polyamine - ethylene oxide adduct having approximately 2 moles of ethylene oxide per amine group in the polyamine.

Similarly, using the procedure of EXAMPLE 2, but incorporating 5 g of potassium hydroxide into the initial reaction mixture and increasing the amount of propylene oxide to 510 g (8.79 moles) there was obtained a poly-N-cyanoethylated polyamine - propylene oxide adduct having approximately 3 moles of propylene oxide per amine group in the polyamine.

EXAMPLE 8

A polyol blend was prepared by mixing equal proportions by weight of (a) the polyol of EXAMPLE 1, part B, and (b) an adduct of 1 mole of glycerol and 3 moles of propylene oxide, said adduct having an equivalent weight of 89. The overall equivalent weight of the blend was 120 and the overall viscosity was about 30,000 centipoises at 25°C.

Similarly, a polyol blend was prepared by mixing equal proportions by weight of (a) the polyol of EXAMPLE 2 and (b) an adduct of 1 mole of glycerol and 3 moles of propylene oxide, said adduct having an equivalent weight of 89. The overall hydroxyl equivalent weight of the blend was 103 and the overall viscosity was about 10,000 centipoises at 25°C.

Other polyol blends were prepared as described above but replacing the glycerol - propylene oxide adduct of equivalent weight of 89 by (a) an adduct of 1 mole of trimethylolpropane and 3 moles of ethylene oxide having an equivalent of 93; (b) diethylene glycol; (c) dipropylene glycol; (d) ethylene glycol; and (e) propylene glycol.

EXAMPLE 9

Three rigid polyurethane foams were prepared using the ingredients and proportions (all parts by weight) set forth in TABLE I below. The procedure adopted was as follows. The two polyol components wre preblended and then admixed, using high speed mechanical stirring with the surfactant and the amine catalysts. The trichlorofluoromethane was then added and the resulting blend was admixed, using high speed stirring for 5 seconds, with the polyisocyanate component. The resulting mixture was then allowed to rise in a quart paper cup. The foam so obtained was cured at room temperature (circa 25°C) for 3 days before being subjected to physical testing. The results of the latter are recorded in TABLE I below. The tests were carried out in accordance with procedures defined in "Physical Test Procedures for Rigid Urethane Foams" published by Market Development Section, Atlas Chemical Industries, Inc., Wilmington, Del.

TABLE I

| Ingredients | A | Foam B | C |
|---|---|---|---|
| Polyol of EXAMPLE 2 | 50 | | |
| Polyol of EXAMPLE 1 | | 50 | |
| Polyol of EXAMPLE 3 | | | 50 |
| Glycerol-propylene oxide adduct (equiv. wt. = 89) | 50 | 50 | 50 |
| Organosilicone Surfactant (SF-1109) | 2 | 2 | 2 |
| N,N,N'-tetramethyl-butane diamine | 0.7 | 0.6 | 1 |
| Triethylamine | 0.7 | 0.6 | 1 |
| Trichlorofluoromethane | 32 | 32 | 33 |
| Polymethylene polyphenyl polyisocyanate (equiv. wt. = 133) | 119 | 122 | 141 |
| NCO Index | 1.10 | 1.10 | 1.10 |
| Polyol Blend Equiv. Wt. | 122 | 120 | 103 |
| Density, pcf | 2.04 | 2.04 | 2.30 |
| // Compression, psi | 32.5 | 27.6 | 26.3 |
| S/D | 15.9 | 13.5 | 11.4 |
| % Δ Volume at 158° F 100% Relative Humidity after: 1 day | 3.5 | 1.8 | 0.4 |
| 7 days | 6.0 | 2.5 | 0.4 |
| % Δ Volume at 200°F Ambient Relative Humidity after: 5 days | 1.7 | −0.7 | −1.0 |
| 7 days | 2.2 | −0.7 | −0.8 |
| % Closed Cells | 93 | 22 | 7.4 |

EXAMPLE 10

Using the procedure described in EXAMPLE 9, there was prepared a self-extinguishing rigid polyurethane foam using the ingredients and proportions (all parts by weight) set forth in TABLE II below. The foam was allowed to cure for 3 days at room temperature (circa 25°C) before being subjected to physical testing using the test procedures set forth in EXAMPLE 9. The results of the latter are recorded in TABLE II.

TABLE II

| Ingredients | Foam D |
| --- | --- |
| Polyol of EXAMPLE 2 | 37.5 |
| Glycerol propylene oxide adduct (Equiv. wt. = 89) | 37.5 |
| Diethyl N,N-di(2-hydroxyethyl)-aminomethane phosphonate | 25 |
| Organosilicone surfactant (SF-1109) | 2 |
| N,N,N',N'-tetramethylbutane diamine | 0.4 |
| Triethylamine | 0.4 |
| Trichloromonofluoromethane | 31 |
| Polymethylene polyphenyl polyisocyanate | 119 |
| NCO Index | 1.10 |
| Polyol Blend (Equiv. wt.) | 122 |
| Density, pcf | 1.88 |
| // Compression, psi | 30.4 |
| S/D | 16.2 |
| % Δ Volume at 158°F, 100% Relative Humidity after: 1 day | 5.5 |
| 7 days | 11.2 |
| % Δ Volume at 200°F, Ambient Relative Humidity after: 5 days | 1.8 |
| 7 days | 1.9 |
| Closed Cells, % | 92 |
| Flame Test (ASTM D 1692-59T) Maximum inches burned | 1.4 |
| Minimum inches burned | 0.7 |

I claim:
1. A polyol blend comprising a mixture of:
   a. from about 90 to about 10 percent by weight of a polyol having the formula:

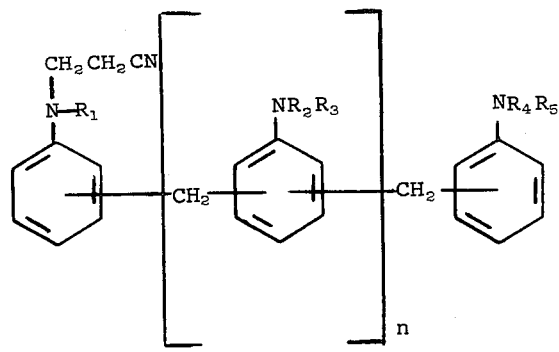

wherein $R_1$, $R_3$ and $R_5$ each represent $-(A-O)_x-H$ wherein A is the alkylene residue of a vicinal alkylene oxide of from 2 to 4 carbon atoms, inclusive, and $x$ is an integer from 1 to 20 and $R_2$ and $R_4$ are each selected from the class consisting of $-CH_2CH_2CN$ and $-(A-O)_x H$ wherein A and $x$ are as above defined, and wherein $n$ is an integer from 0 to 4, inclusive,
   b. from about 10 to about 90 percent by weight of a supplementary polyol having a functionality in the range of 2 to 6, inclusive, and an equivalent weight in the range of 30 to 200.

2. A polyurethane foam which comprises the product of reaction of an organic polyisocyanate and a polyol blend of claim 1 in the presence of a catalyst and a blowing agent.

3. A polyurethane foam which comprises the product of reaction of an organic polyisocyanate and a polyol of the following formula in the presence of a catalyst and a blowing agent:

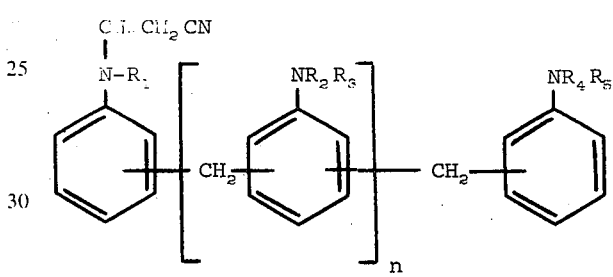

wherein $R_1$, $R_3$, and $R_5$ each represent $-(A-O)_x-H$ wherein A is the alkylene residue of a vicinal alkylene oxide of from 2 to 4 carbon atoms, inclusive, and $x$ is an integer from 1 to 20 and $R_2$ and $R_4$ are each selected from the class consisting of $-CH_2CH_2CN$ and $-(A-O)_x H$ wherein A and $x$ are as above defined, and wherein $n$ is an integer from 0 to 4, inclusive.

* * * * *

UNITED STATES PATENT OFFICE
CERTIFICATE OF CORRECTION

Patent No. 3,876,570      Dated April 8, 1975

Inventor(s) Adnan A. R. Sayigh

It is certified that error appears in the above-identified patent and that said Letters Patent are hereby corrected as shown below:

Column 6, Line 13:      Should read:

pages 1 to 105 (1975);      pages 1 to 105 (1957);

Column 8, Line 26:      Should read:

B. A total of 433.7 g.      B. A total of 443.7 g.

Column 12, Claim 1, Line 1:      Should read:

$-(A-O)-H$      $-(A-O)_{\overline{x}}-H$

Signed and Sealed this fifth Day of August 1975

[SEAL]

Attest:

RUTH C. MASON
*Attesting Officer*

C. MARSHALL DANN
*Commissioner of Patents and Trademarks*